United States Patent [19]
Phillips et al.

[11] Patent Number: 5,530,844
[45] Date of Patent: Jun. 25, 1996

[54] METHOD OF COUPLING OPEN SYSTEMS TO A PROPRIETARY NETWORK

[75] Inventors: David L. Phillips; Wayne C. Kahn, both of Phoenix; Tina M. Rodrigo, Gilbert; Laurence A. Clawson, Cave Creek; Kevin P. Staggs, Peoria, all of Ariz.

[73] Assignee: Honeywell Inc., Minneapolis, Minn.

[21] Appl. No.: 194,777

[22] Filed: Feb. 10, 1994

Related U.S. Application Data

[63] Continuation of Ser. No. 899,442, Jun. 16, 1992, abandoned.

[51] Int. Cl.⁶ ........................................................ G06F 3/00
[52] U.S. Cl. ................... 395/500; 364/228.1; 364/228.6; 364/285; 395/200.08; 395/200.18
[58] Field of Search ..................................... 395/200, 250, 395/162, 163, 164, 165, 500, 200.18, 200.08

[56] References Cited

U.S. PATENT DOCUMENTS

| | | | |
|---|---|---|---|
| 4,930,121 | 5/1990 | Shiobara | 370/85.4 |
| 5,109,483 | 4/1992 | Baratz et al. | 395/200 |
| 5,150,472 | 9/1992 | Blank et al. | 395/425 |
| 5,163,131 | 11/1992 | Row et al. | 395/200 |
| 5,163,138 | 11/1992 | Thirumalai | 395/325 |
| 5,185,877 | 2/1993 | Bissett et al. | 395/325 |
| 5,289,575 | 2/1994 | Godfrey | 395/162 |
| 5,357,612 | 10/1994 | Alaiwan | 395/200 |
| 5,377,191 | 12/1994 | Farrell et al. | 370/94.1 |
| 5,404,445 | 4/1995 | Matsumoto | 395/162 |
| 5,438,663 | 8/1995 | Matsumoto et al. | 395/162 |

OTHER PUBLICATIONS

Ramos et al, "Data Communications & Networking Fundamentals Using Novell Netware", ©1992, pp. 109–110.

Primary Examiner—Thomas C. Lee
Assistant Examiner—Sang Hui Kim
Attorney, Agent, or Firm—Arthur A. Sapelli

[57] ABSTRACT

An interface provides a path to transfer data from a proprietary network to an open system. The proprietary network includes at least one module central processing unit (CPU) and a module memory associated therewith operatively connected to the proprietary network. A shared memory and shared memory logic are interposed between the proprietary network and the open system, thereby forming the data path. The method comprises the steps of accepting requests for data from the open system by a parasitic task function within the module CPU. The data requested of the proprietary network is obtained and placed in a predetermined location of the module memory in a form understandable to the open systems. A pointer value is placed in the shared memory, the pointer value containing the value of the predetermined location of the module memory, the shared memory being mapped in the addressable memory space of the shared memory logic using virtual memory techniques. The data is obtained directly from the module memory utilizing the pointer value corresponding to the data requested, thereby allowing open systems to access the proprietary system while maintaining the integrity of the proprietary network.

1 Claim, 7 Drawing Sheets

METHOD OF COUPLING OPEN SYSTEMS TO A PROPRIETARY NETWORK

RELATED APPLICATIONS

This is a continuation of application Ser. No. 07/899,442 filed on Jun. 16, 1992 now abandoned.

The present application is related to the following:

a) patent application, Ser. No. 07/899,198, entitled "An Open Distributed Digital System" by K. Staggs et al now abandoned;

b) patent application, Ser. No. 07/899,441, entitled "A Method for Controlling Window Displays in an Open System Windows Environment" by K. Staggs et al now U.S. Pat. No. 5,386,503;

c) patent application, Ser. No. 07/899,440, entitled "Priority Based Graphics for an Open Systems Windows Environment" by W. B. Kilgore et al now U.S. Pat. No. 5,426,725;

d) patent application, Ser. No. 07/899,199, entitled "Directly Connected Display of a Process Control System in an Open System Windows Environment" by W. B. Kilgore now abandoned;

e) patent application, Ser. No. 07/899,197, entitled "Device Dependent Layer of a Windowing System for a Process Control System" by B. Kilgore et al now abandoned;

all of the above filed on even date herewith, and all of the above assigned to Honeywell Inc., the assignee of the present application.

BACKGROUND OF THE INVENTION

This invention relates to distributed digital systems, and more particularly, to distributed digital systems having a plurality of nodes coupled to a network for communicating between nodes, wherein a once closed (or proprietary) network is opened to permit a variety of nodes to be coupled to the network.

There currently exists systems having a plurality of nodes operatively connected to a bus or network in which the nodes are developed by a single manufacturer who enforces strict control over the design of the nodes and over the functions to be performed by the nodes. Further, a predetermined protocol is utilized by the network which results in a "closed" environment.

In order to allow a user the option of selecting equipment of other manufactures, having differing protocols, and thereby expanding the capabilities and functionality of these systems, it is desired to have an "open" systems environment which permits the user to connect (directly or indirectly) these equipments of other manufacturers having differing designs to the network of the system. By opening up the system to these equipments, the reliability of the system is now susceptible to any errors (bugs, viruses, ...) of the new equipment being added which is not under the control of the manufacturer of the system.

Thus, the present invention provides a method for coupling open systems to a proprietary network while maintaining the high reliability that the system had before opening up the environment, the open systems including networks, computer platforms, ... of other manufacturers. By opening the system, commercially available utility software can be utilized on the open systems thereby increasing the software functionality of the system.

SUMMARY OF THE INVENTION

Therefore, there is provided by the present invention, a method for coupling open systems to a proprietary network. An interface provides a path to transfer data from a proprietary network to an open system. The proprietary network includes at least one module control processing unit (CPU) and a module memory associated therewith operatively connected to the proprietary network. A shared memory and shared memory logic are interposed between the proprietary network and the open system, thereby forming the data path. The method comprises the steps of accepting requests for data from the open system by a parasitic task function within the module CPU. The data requested of the proprietary network is obtained and placed in a predetermined location of the module memory in a form understandable to the open systems. A pointer value is placed in the shared memory, the pointer value containing the value of the predetermined location of the module memory, the shared memory being mapped in the addressable memory space of the shared memory logic using virtual memory techniques. The data is obtained directly from the module memory utilizing the pointer value corresponding to the data requested, thereby allowing open systems to access the proprietary system while maintaining the integrity of the proprietary network.

Accordingly, it is an object of the present invention to provide a method of coupling open systems to a proprietary network.

It is another object of the present invention to provide a method of coupling open systems to a proprietary network wherein the open systems has access to data of the proprietary network.

It is yet another object of the present invention to provide a method of coupling open systems to a proprietary network wherein the open system has direct access to data of the proprietary network.

It is still another object of the present invention to provide a method of coupling open systems to a proprietary network wherein the open systems has direct access to data of the proprietary network on essentially a realtime basis.

It is a further object of the present invention to provide a method of coupling open systems to a proprietary network wherein the open system has direct access to data of the proprietary network while maintaining the integrity of the proprietary network.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 8, which comprises FIGS. 8A and 8 B, shows examples of screen displays of the display unit of the process control system.

DETAILED DESCRIPTION

Figure 1:
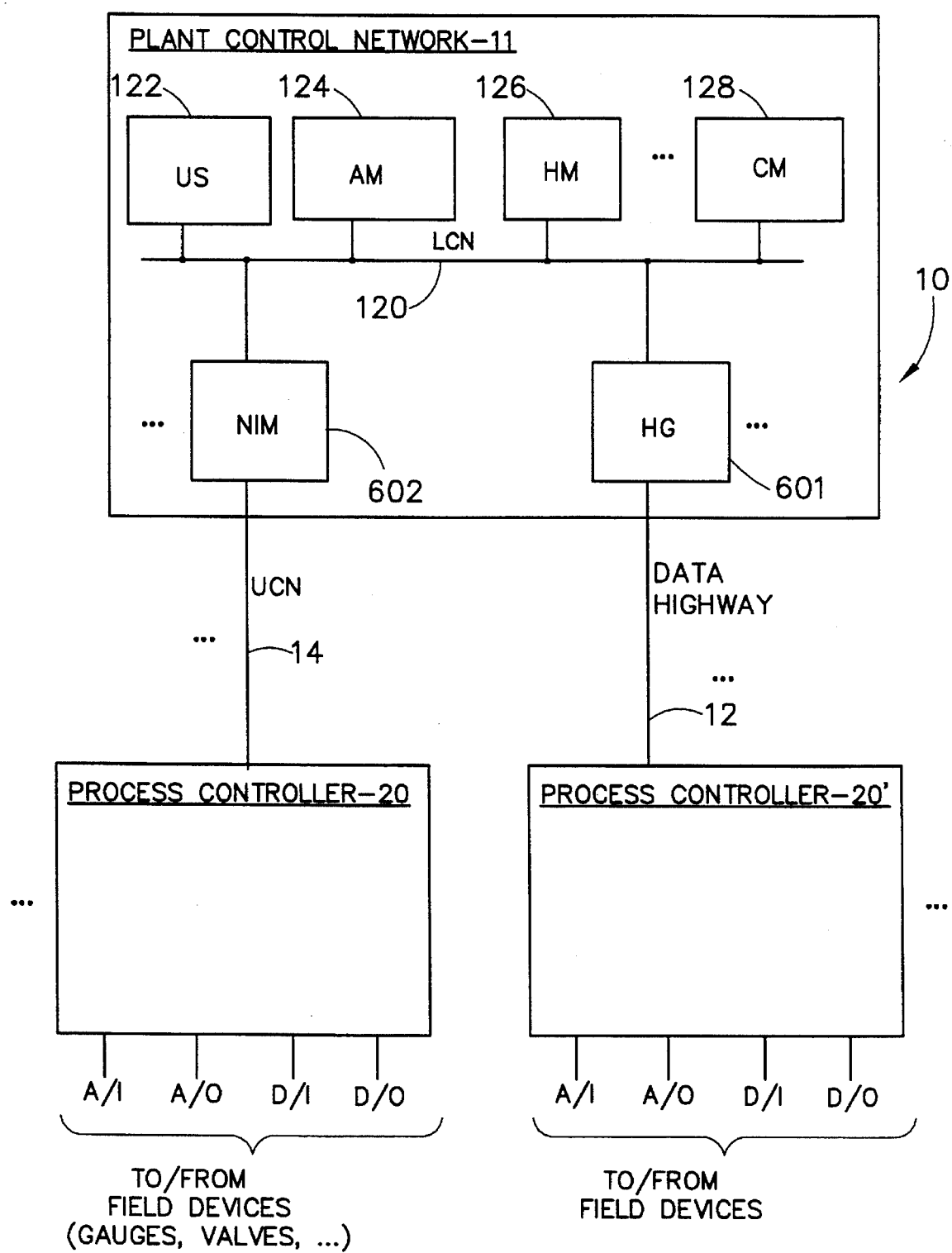
FIG. 1 shows a block diagram of a process control system of the preferred embodiment in which the present invention can be utilized.

Before describing the method of the present invention, it will be helpful in understanding a system environment in which the invention is utilized. Referring to FIG. 1, there is shown a block diagram of a process control system 10 of the preferred embodiment in which the present invention can be found. The process control system 10 includes a plant control network 11, and connected thereto is a data highway 12, which permits a process controller 20' to be connected thereto. In the present day process control system 10, additional process controllers 20' can be operatively connected to the plant control network 11 via a corresponding highway gateway 601 and a corresponding data highway 12. A process controller 20, an interface apparatus which includes many new, additions, improvements, and features over the process controller 20' is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20' interface the analog input and output signals, and digital input and output signals (A/I, A/O, D/I, and D/O respectively) to the process control system 10 from the variety of field devices (not shown) of the process being controlled which include valves, pressure switches, pressure gauges, thermocouples, . . .

The plant control network (or more simply network) 11 provides the overall supervision of the controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates (backup or secondary) of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 and HG 601 provide an interface between the LCN 120 and the UCN 14, and the LCN 120 and the data highway 12, respectively.

Physical modules 122, 124, 126, 128, . . . of network 11 of the preferred embodiment are of various specialized functional types. Each physical module is the peer, or equivalent, of the other in terms of right of access to the network's communication medium, or LCN 120, for the purpose of transmitting data to other physical modules of network 11.

Universal operator station module (US) 122 of network 11 is a work station for one or more plant operators. It includes an operator console which is the interface between the plant operator, or operators, and the process or processes of the plant for which they are responsible. Each universal operator station module 122, is connected to the LCN 120, and all communications between the universal operator station module 122, and any other physical module of network 11, is via the LCN 120. Universal operator station module 122 has access to data that is on the LCN 120 and the resources and data available through, or from, any of the other physical modules of network 11. The universal station module 122 includes a cathode ray tube display (CRT) (not shown) which includes a video display generator, an operator keyboard (KB) (not shown), a printer (PRT) (not shown), and can also include (but not shown) a cartridge disk data storage device, trend pen recorders, and status displays, for example.

A history module (HM) 126 provides mass data storage capability. The history module 126 includes at least one conventional disk mass storage device such as a Winchester disk, which disk storage device provides a large volume of nonvolatile storage capability for binary data. The types of data stored by such a mass storage device are typically trend histories, event histories, . . . or data from which such histories can be determined, data that constitutes or forms CRT type displays, copies of programs for the physical modules. . .

An application module (AM) 124 provides additional data processing capability in support of the process control functions performed by the controllers associated with the process control subsystem 20, 20' such as data acquisition, alarming, batch history collection, and provide continuous control computational facilities when needed. The data processing capability of the application module 124 is provided by a processor (not shown) and a memory (not shown) associated with the module.

Computer module (CM) 128 uses the standard or common units of all physical modules to permit a medium-to-large scale, general purpose data processing system to communicate with other physical modules of network 11 and the units of such modules over the LCN 120 and the units of process control subsystems 20, 20' via the highway gateway module 601, and the NIM 602, respectively. Data processing systems of a computer module 128 are used to provide supervisory, optimization, generalized user program preparation and execution of such programs in higher level program languages. Typically, the data processing systems of a computer module 128 have the capability of communicating with other such systems by a communication processor and communication lines.

The local control network 120 (LCN) is a high-speed, bit serial, dual redundant communication network that interconnects all the physical modules of plant control network 11. LCN 120 provides the only data transfer path between the principal sources of data, such as highway gateway module 601, application module 124, and history module 126, and principal users of such data, such as universal operator station module 122, computer module 128, and application module 124. LCN 120 also provides the communication medium over which large blocks of data, such as memory images, can be moved from one physical module such as history module 126 to universal station module 122. LCN 120 is dual redundant in that it consists of two coaxial cables that permit the serial transmission of binary signals over both cables.

Figure 2:
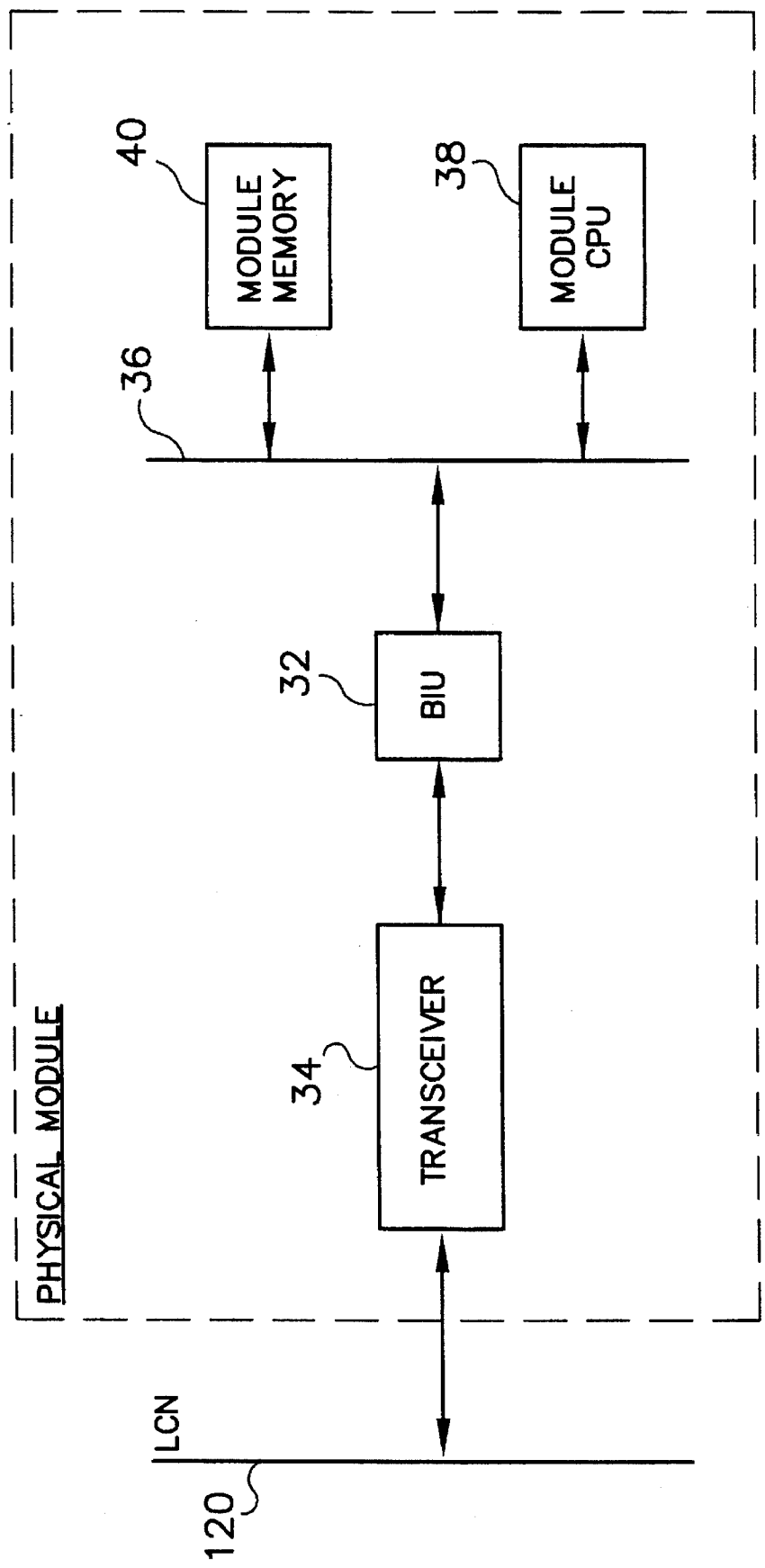
FIG. 2 shows a block diagram of common elements of each physical module of the process control system of FIG. 1.

Referring to FIG. 2, there is shown a block diagram of the common elements of each physical module of the network 11 or the process control system 10. Each of the physical modules includes a module central processor unit 38 and a module memory 40, a random-access memory (not shown), and such additional controller devices, or units (not shown), which are configured to provide the desired functionality of that type of module, i.e., that of the operator station 122, for example. The data-processing capabilities of each module's CPU 38 and module memory 40 create a distributed processing environment which provides for improved reliability and performance of network 11 and process control system 10. The reliability of network 11 and system 10 is improved because, if one physical module of network 11 fails the other physical modules will remain operational, As a result, network 11 as a whole is not disabled by such an occurrence as would be the case in centralized systems. Performance is improved by this distributed environment in that throughput and fast operator response times result from the increase computer processing resources, and the concurrency and parallelism of the data-processing capabilities of the system.

As mentioned above, each physical module includes the bus interface unit, BIU, 32 which is connected to the LCN 120 by the transceiver 34. Each physical module is also provided with the module bus 36 which, in the preferred embodiment, is capable of transmitting 16 bits of data in parallel, between the module CPU 38 and the module memory 40. Other units, utilized to tailor each type of physical module to satisfy its functional requirements, are operatively connected to module bus 36 so that each such unit can communicate with the other units of the physical module via its module bus 36. The BIU 32 of the physical module initiates the transmission of data over LCN 120. In the preferred embodiment, all transmissions by a BIU 32 are transmitted over the coaxial cables which, in the preferred embodiment, form the LCN 120.

Figure 3:
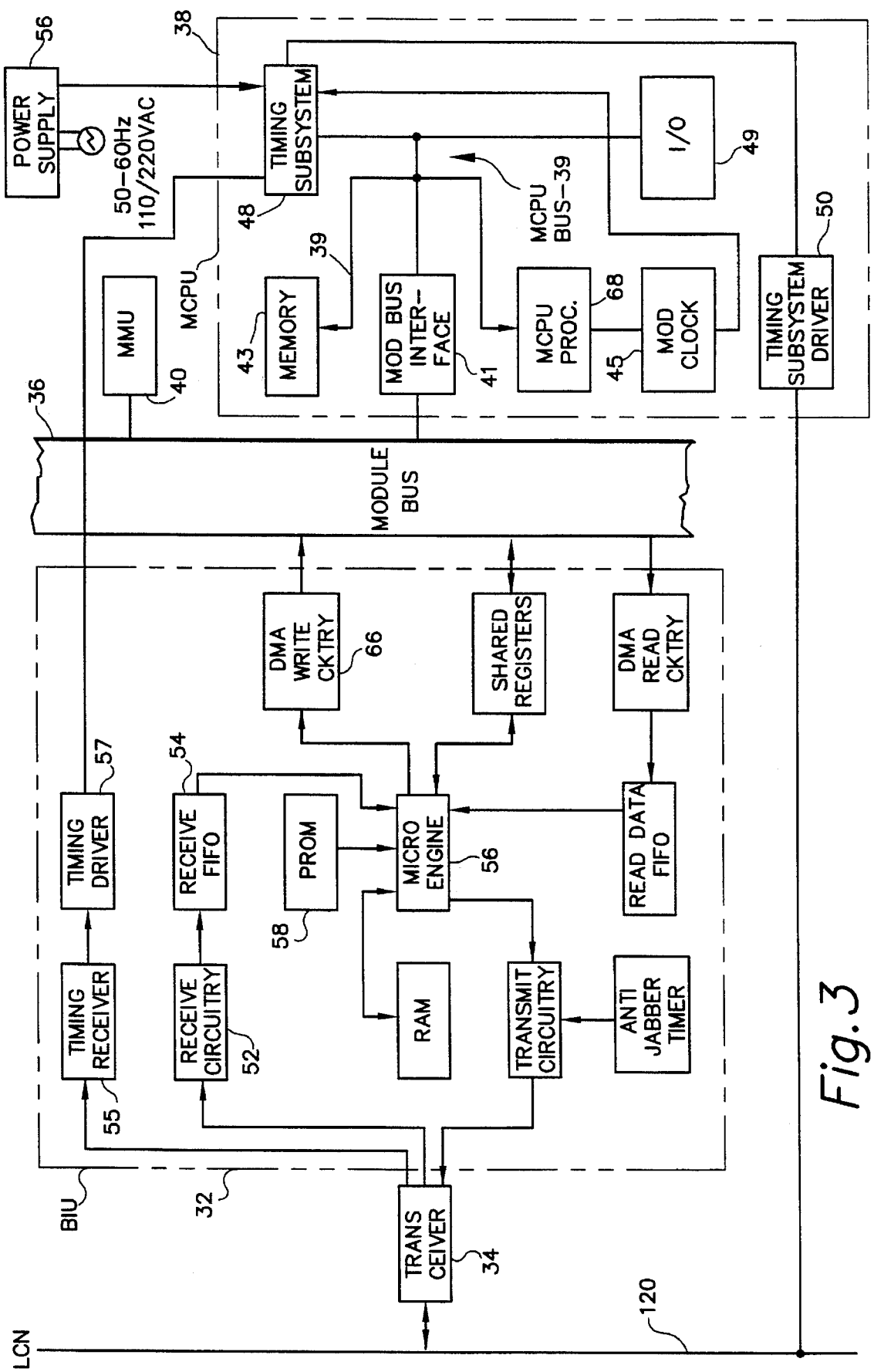
FIG. 3 shows a functional block diagram of a typical physical module of the process control system.

Referring to FIG. 3 there is shown a functional block diagram of a typical physical module 122, 124, 126, 128 of the plant control network 11, and includes the bus interface unit (BIU) 32 and the transceiver 34, which connects BIU 32 to the LCN 120. BIU 32 is capable of transmitting binary data over LCN 120 and of receiving data from LCN 120. Transceiver 34 in the preferred embodiment, is transformer coupled to the LCN 120. In the preferred embodiment, the LCN 120 is a dually redundant coaxial cable with the capability of transmitting bit serial data. BIU 32 is provided with a very fast microengine 56. In the preferred embodiment, micro engine 56 is made up of bit slice components so that it can process eight bits in parallel, and can execute a 24 bit microinstruction from its programmable read only memory (PROM) 58.

Signals received from the LCN 120 are transmitted by transceiver 34 and receive circuitry 52 to receive FIFO register 54. Micro engine 56 examines the data stored in FIFO register 54 and determines if the information is addressed to the physical module. If the data is an information frame, the received data is transferred by direct memory access (DMA) write circuitry 66 by conventional direct memory access techniques to the physical module memory unit (MMU) 40 over module bus 36.

Communication between MCPU processor 68, a Motorola 68020 microprocessor in the preferred embodiment, and other functional elements of MCPU 38 is via local microprocessor bus 39. Module bus interface element 41 provides the communication link between local bus 39 and module bus 36. Processor 68 executes instructions fetched from either its local memory 43, in the preferred embodiment an EPROM, or from MMU 40. Processor 68 has a crystal controlled clock 45 which produces clock pulses, or timing signals. Input/output (I/O) port 49 provides communication between MCPU 38 and equipment external to the physical module to permit program loading, and the diagnosis of errors, or faults, for example.

Each MCPU 38 includes a timing subsystem 48 which, in response to clock signals from module clock 45 produces fine resolution, synchronization, and real-time, timing signals. Any timing subsystem 48 which is provided with a timing subsystem driver 50, has the capability of transmitting timing information to other physical modules over the LCN 120. Another input to each timing subsystem 48, is timing information which is transmitted over LCN 120 and which is received through transceiver 34, timing receiver 55 and timing driver 57 of BIU 32. Timing pulses from module power supply 59 which are a function of the frequency of the external source of A.C. electric power applied to power supply 59 are used by timing subsystem 48 to correct longer term frequency drift of the clock pulses produced by clock 45.

Additional information of the BIU 32 can be found in U.S. Pat. No. 4,556,974. A more detailed description of the process control system 10 can be had by referring to U.S. Pat. No. 4,607,256. Additional information of the individual, common, functional blocks of the physical modules can be had by reference to U.S. Pat. No. 4,709,347, all of the above-identified patents being assigned to the assignee of the present application, and additional information of the process controller 20' can be had by referencing U.S. Pat. No. 4,296,464.

The addition of an interface apparatus which interfaces other systems (i.e., open or foreign systems) to the process control system 10 described above, which includes providing the capability to readily permit nodes of differing designs to communicate to the network 120, will now be described. Also, specifically describes is a modification to a graphics generator in the US 122 which opens up the existing system, in particular the graphics interface.

Figure 4:
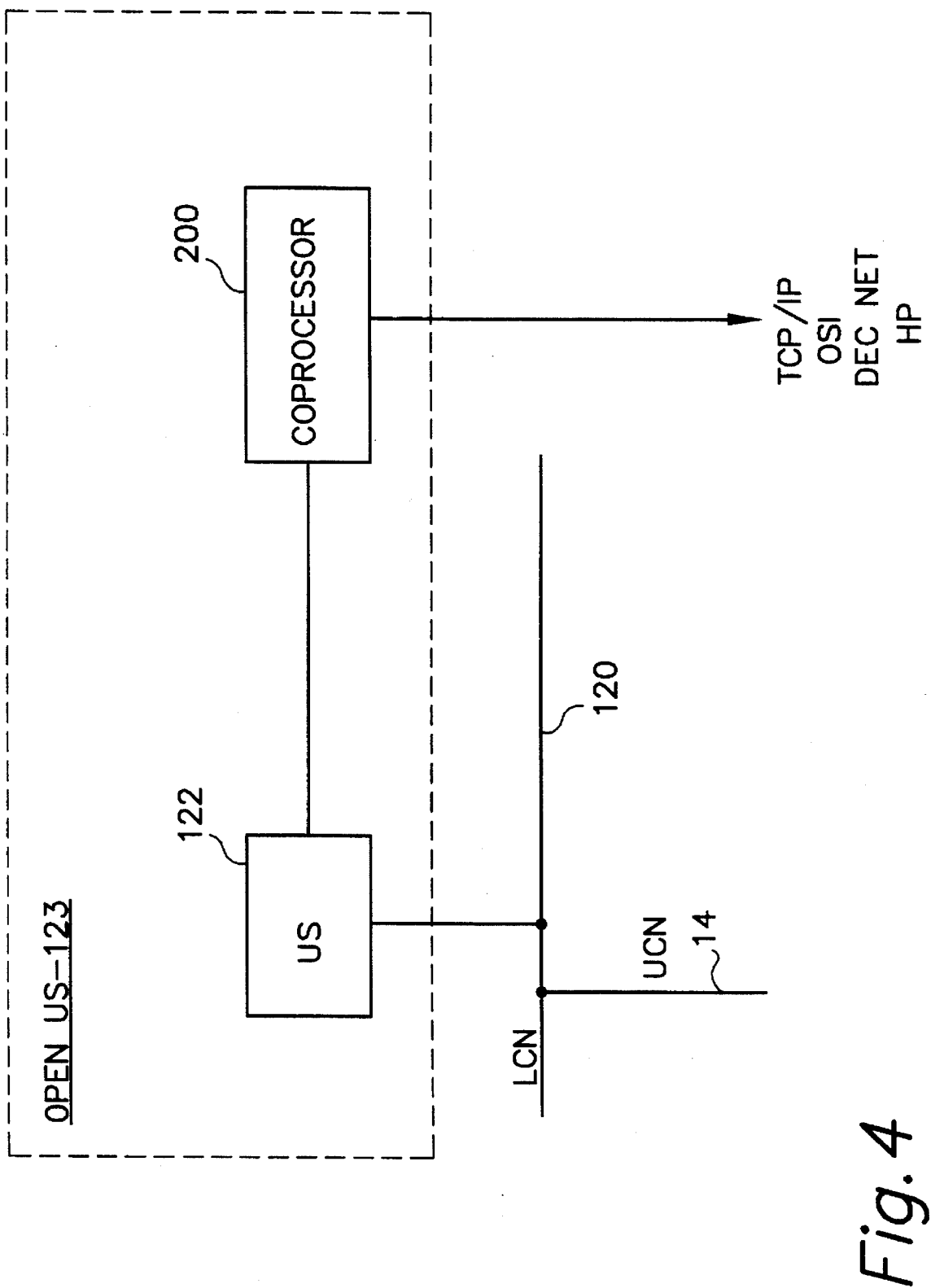
FIG. 4 shows a partial, functional block diagram of the existing system and the opened system of the preferred embodiment.

Referring to FIG. 4, there is shown a partial functional block diagram of the existing system and the open (or opened) system. The universal operator station (US) 122 is coupled to a co-processor 200, and the co-processor is coupled to an open system, i.e., interfaces/protocols of differing design, including Transmission Control Protocol. Internet Protocol (TCP/IP), open system interface (OSI), DECnet (a product of the Digital Equipment Corporation of Maynard, Mass.), Hewlett Packard personal computers, (HP), . . . The universal station 122 is also connected to the LCN 120 as described above. Thus, the new universal operator station (open US) 123 includes the US 122 as described above in conjunction with the co-processor 200. The purpose of the open US 123 is to open the graphical interface to the open systems and to provide information from the closed US to the open systems. The co-processor 200 is structured to permit the interface to other systems, i.e., the open systems without jeopardizing the integrity of the existing system. The co-processor 200 of the preferred embodiment is a Motorola 68040 microprocessor which is executing the UNIX operating systems (UNIX is an operating system of the American Telephone and Telegraph Company, ATT, is readily available and is well known to those skilled in the art), and is sometimes referred to as a UNIX co-processor.

Figure 5:
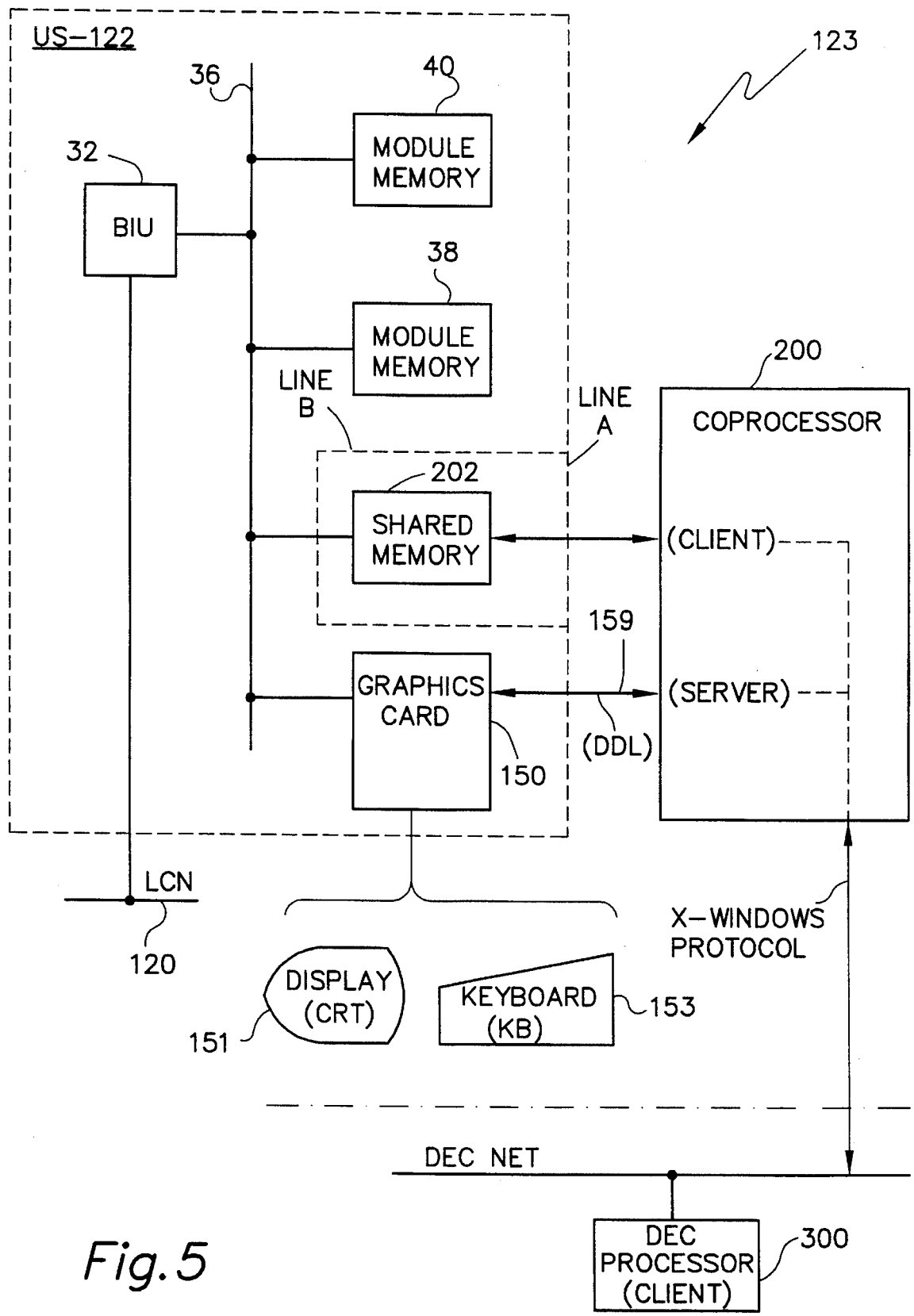
FIG. 5 shows a functional block diagram of an open operator station of the preferred embodiment.

Referring to FIG. 5, there is shown a functional block diagram of the open operator station 123 of the preferred embodiment. The operator station 122 as described above includes the BIU 32 connected to the module bus 36, the module memory 40, and the module CPU 38, both also connected to the module bus 36. These basic functional blocks are contained in all the physical modules. Additional functional blocks added to the physical module is what gives the physical module its personality apart from any other physical module. The operator station 122 includes a graphics card 150 which interfaces with a display (CRT) and a keyboard (KB) 151, 153.

A shared memory 202 is included and is also connected to the module bus 36 which provides for communication between the co-processor 200 and the US physical module 122 (thereby providing communication to the rest of the process control system 10 via the module CPU 38). The method of communication between the module CPU 38 and the co-processor essentially implements the method of the present invention whereby the open systems is coupled to the proprietary network. Thus, the co-processor 200 requests service (e.g., the value of a point, contents of a file, . . . or any information of the process control system 10) of the module CPU 38 through shared memory 202. The module CPU 38 then communicates with the appropriate module to perform the requested service in a normal fashion. Once the response is obtained the information is passed to the co-processor 200 via shared memory 202. Since the module CPU 38 is communicating via the LCN 120, the integrity of the LCN (i.e., the system) is maintained and similarly the module memory 40 cannot be corrupted by the co-processor 200.

Although shared memory 202 is shown within the dotted lines of US 122 (dotted line A), it will be recognized by those skilled in the art that shared memory 202 can also be part of coprocessor 202 or a stand-alone unit interposed between the US 122 and coprocessor 200 (dotted line B). Such arrangements are essentially "packaging" arrangements and have essentially no bearing of the function provided. The shared memory 202 (and associated circuitry, not shown) provides for the direct coupling of an open systems processor (i.e., DEC, HP, . . . ) to the process control system 10, thereby permitting the open systems processor to effectively function as a peer to the other physical modules or nodes of the network 120. In this environment, the coprocessor 200 essentially has direct access to the module memory 40. Through this direct access, the coprocessor 200 can access and/or modify data in real time. (By convention, the coprocessor 200 is not permitted to modify data in the module memory 40.) However, the module CPU 38 provides the interface which translates the proprietary LCN data to a form usable by the open systems and/or coprocessor 200.

Also shown in FIG. 5 is an example open system (or foreign system), for example, a Digital Equipment Corporation system which includes the DECnet network and protocol and a DEC processor 300 attached to the DECnet network. In the preferred embodiment, the communication between the DEC open system and the co-processor 200 is via an X-windows protocol (X-windows being a protocol defined by the Massachusetts Institute of Technology, Cambridge, Mass.) for graphical display information, and other open systems standards being used for data exchange. Any requests of the outside system to the LCN is made via the co-processor 200 through the shared memory 202 to the module CPU 38 as described above.

As mentioned above, the physical modules include common elements; however additional modules to each of the physical modules provides the "personality" of the physical module. The personality of the physical module provides the base environment for enhancements and improvements to the process control system 10 by the addition of the open systems. For example, the application module 124 of the process control system 10, exhibits a personality which provides for the complex control of process data through user programs. This personality provides the basis for enhancement by the co-processor 200 by exploiting the computing capabilities of both the open system and the coprocessor 200 to further extend the programs through commercially available software such as spread sheet, data base manager, . . . In the case of US 122, the personality is based on the graphics card 150. In the preferred embodiment, the coprocessor 200 provides the capability to enhance the display of the US 122 (and thereby enhancing the personality of the process control system 10) by utilizing the advanced display capabilities of the co-processor such as multiple display windows.

Figure 6:
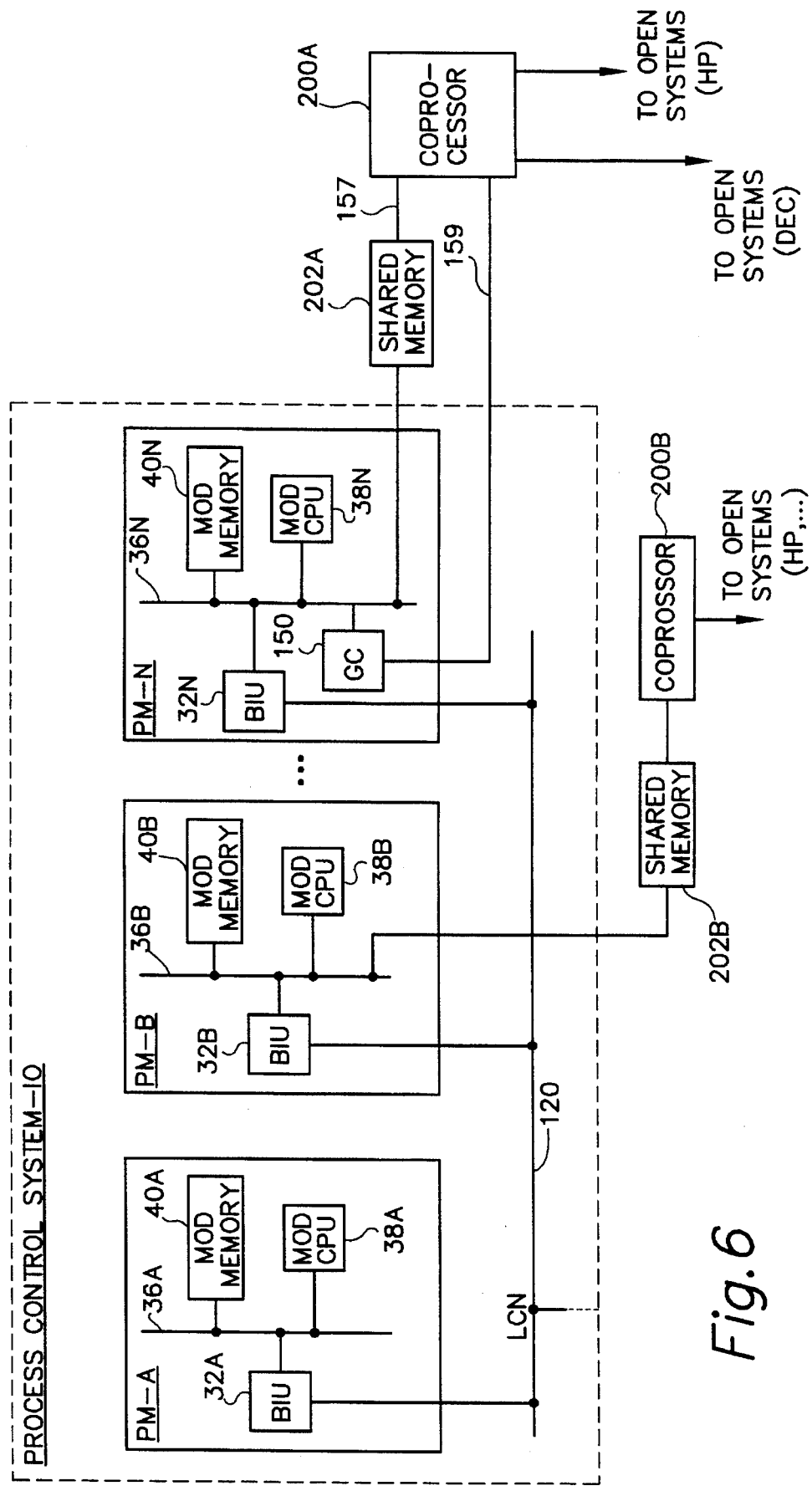
FIG. 6 shows a block diagram of the proprietary network and the interface for coupling to open systems.

Referring to FIG. 6, there is shown a block diagram of the proprietary network and the interface for coupling to open systems. The coupling to open systems is achieved through the use of the coprocessor 200A and shared memory 202A. Through this path, first channel 157, the coprocessor 200A can see the module memory 40N and the shared memory 202A. Each module CPU 38 is executed and modifying data within its corresponding module memory 40. A module CPU 38 communicates that data among other module CPU's by indicating where the data is located. In the process control system 10 (or LCN environment) each module CPU knows the LCN protocol and therefore knows the data structure. The data exchange is communicated between other module CPU or between tasks within the same module CPU via messages which are essentially pointers indicating where the data is located. The data can also be passed to another node by actually passing the data value itself. In the process of connecting open system to the proprietary network, an objective is to maintain high reliability of the proprietary network. In response to a request from the open system through the coprocessor 200A, data can be sent to the open system; however, the data can subsequently change so that the original requester does not always have the latest value of the data, i.e., the data is transitory. Shared memory is utilized so that the open system can have direct access to the data location, the data location being the only copy of the data thereby ensuring that the open system always has access to the latest data value.

The structure of the physical modules, in particular the module CPU 38, is such that various tasks are executing under the control of an operating system. In order to minimize the impact to the physical module and thereby potentially introducing new errors and reducing the reliability, the interface communication is achieved by adding a new task in the module CPU 38, the new task performing a parasitic function. The newly added task intercepts data between tasks or between nodes and passes the data to the open system before the originally intended recipient has access to the data. Thus, the open system can use/modify the data and then pass it on to the originally intended recipient (or assume the role of the intended recipient with respect to the data). The direct access to the module memory 40 by the coprocessor 200 is achieved through the use of shared memory, the coprocessor mapping the shared memory in its addressable memory location. Thus the coprocessor only has access to the data of the module memory in which it has knowledge of where the data is located within module memory through a pointer in the shared memory 202. The coprocessor mapping is achieved via virtual memory mapping techniques well known those skilled the art. The newly added task performs the loading of the pointers in the shared memory and also performs a translation of the data in the module memory such that the data is meaningful to the open system.

The coprocessor 200 also communicates directly to the graphics card 150 by a direct path, second channel, 159 essentially the same as the communication between the coprocessor 200 and shared memory 202. The interface consists of two distinct elements that are coupled through a shared memory 158 on the graphics card 150. A first logic element or task which implements the communication function is executed by the coprocessor 200 connected to the card bus 152. The first logic element executes on the graphics card, i.e., a graphics processor 160. When the second logic element is started, the shared memory 158 is memory mapped into the address range of the second element address range. The second element executing in the coprocessor 200, after the graphics card 150 is started, loads the graphics processor 160 with the necessary program functions stored in the coprocessor 200. The second element executing in the coprocessor 200 passes messages to the graphics processor 160 through the shared memory 158 of graphics card 150. Messages are passed with the use of pointers, the pointers being kept in a structure of the shared memory 158 with both the coprocessor 200 addressing and the graphics processor 160 addressing. Through the use of passing messages, the control of the display unit is perfoiled, including various data information, command information, and validation or status checks. These checks and validations are described in related application b.

It will be recognized by those skilled in the art that various configurations may be implemented in capturing the spirit and scope of the present invention. For example the coprocessor 200A can have additional channels to the open systems. Additional coprocessors 200B with corresponding shared memory 202B can be interfaced to any of the physical modules. Further since the module CPU 38 can communicate via the LCN 120 with any of the other physical modules the need to interface a coprocessor 200 and shared memory 202 to an individual physical module is unnecessary since, as mentioned above the module CPU 38 can communicate with any other physical modules on the LCN 120. The co-processor 200A is shown interfacing with the physical module N, the physical module being the universal station 122. This is indicated by the graphics card 150 being attached to the module bus 36N, the graphics card giving the physical module the personality as discussed above. The coprocessor 200A interfaces to the open system via an open system protocol, in the specific example and in the preferred embodiment the X-windows protocol. In a similar fashion coprocessor 200B interfaces to the open system, in this case an HP computer platform using a predefined available protocol. By providing the logic within the coprocessor and within the newly added task added to the various module CPU's, the interface with the proprietary LCN network is thereby achieved.

The module CPU 38 executes a set of tasks under an operating system. These tasks execute the various tasks and utilize existing interfaces to access the location of and movement of data within the process control system 10. The primary function of these tasks is to provide the predetermine functions consistent with the personality of the physical module. In addition, the present invention adds a task for implementing the method of the present invention which services requests for data by the coprocessor 200. In addition, the newly added task provides a translation of the process control system data (or LCN data) usable by the coprocessor 200. The newly added task executes the requested service in the module CPU 38 and passes a pointer to the coprocessor by a shared memory 202 so that the coprocessor does not have to wait for a copy of the data. This also insures uniqueness through use of a single copy of the data when it is maintained dynamically by the module CPU 38, or any other physical module of the process control system 10. The pointer value passed to the coprocessor 200, points to a virtual memory location in which the module memory 40 is mapped. Thus, the coprocessor 200 can directly access module memory 40 utilizing the pointer value, the data having been translated by the module CPU 38 into a form compatible with and usable by the coprocessor 200, The coprocessor 200 can have more than a single request from more than a single requestor of the open systems. In such case, the shared memory 202 is mapped into a virtual memory format allocating virtual memory space for the various requestors.

The coprocessor 200 includes logic which interfaces with and communicates with the newly added task of the module CPU 38. The coprocessor 200 logic performs functions to utilize and conform to establish industry standard interfaces recogniziey by the commercial software. In this interface the software functions as a server which provides a unique interface path for module CPU 38 for each program of the open system that requests its services. An application software package which executes on the coprocessor 200 is designed and implemented using commercial tools, software utilities, and data libraries. The application is designed to utilize the capabilities afforded by the commercial software to perform service not available on the process control system 10. Such services may include access of data on multiple open system computer platforms within the outside systems environment which are not compatible with the process control system 10 environment. These services are combined with the capability to access the process control system data needed to perform the application. Functionally, each application software program utilizes a defined set of generic or general purpose requests to access process control system data and functions. These requests utilize industries standard data format representations that is easily exchanged with and manipulated by commercial software programs. The interface function of the coprocessor 200 provides the service of passing these requests to the process control system physical module. The module CPU 38 of the physical module translates the service to its proprietary LCN form and executes the request. The response is returned to the requesting open system by the coprocessor 200 in a form which the application software can interpret.

Figure 7:
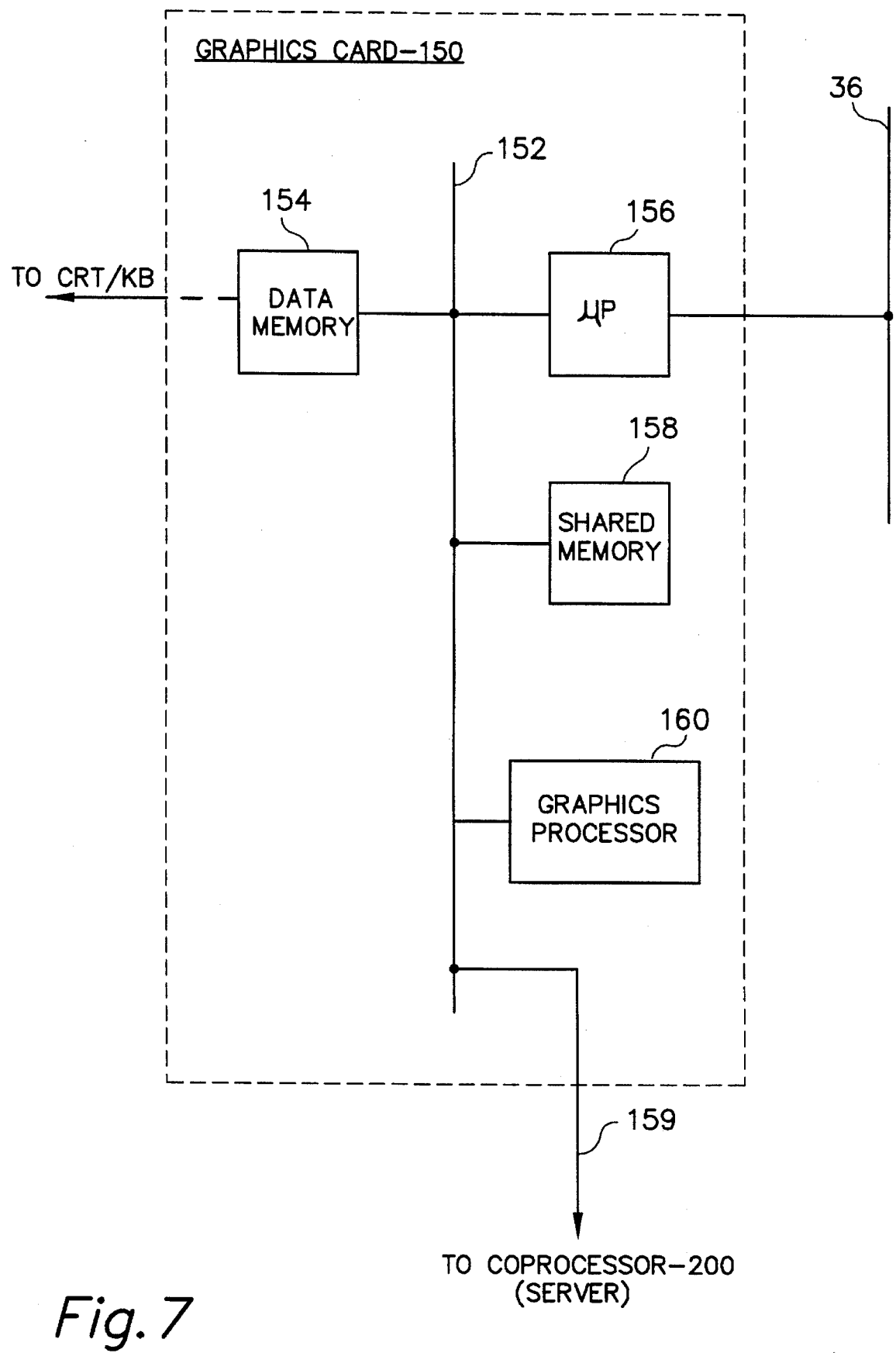
FIG. 7 shows a block diagram of a graphics card of the preferred embodiment.

It is also desired to open up the graphics interface such that a display which is not on the LCN can be displayed onto the CRT 151 of the US 122. This is achieved by the interface to the graphic card 150 from the co-processor 200. Referring to FIG. 7, there is shown a block diagram of the graphics card 150 of the preferred embodiment. The graphics card includes a card bus 152. Attached to the card bus 152 is a data memory 154 which contains the information which is to be displayed onto the CRT, and also contains some control information. A microprocessor 156 is also coupled to the card bus 152 and further is coupled to the module bus 36. A graphics processor 160 is coupled to the card bus 152 and performs all the processing for developing the information stored in the data memory 154, including some control functions. A shared memory 158 is coupled to the card bus 152. A connection is made from the card bus 152 to the co-processor 200, thereby providing the interface mentioned above to the graphics card 150 from the co-processor 200. The microprocessor 156 of the preferred embodiment of the graphic card 15 is a Motorola 68020 processor. The graphics card 150 is a two port graphics card, one port of the graphics card being tied to the module bus 36 which is how a display is driven from LCN. The LCN 120 provides a "single window to the process," i.e., a screen display of what the process/process control system is doing. The second port is coupled to the co-processor 200 and provides the windows interface for the universal station 122. The windows interface is the X-windows interface which is well defined and well known to those skilled in the art (the interface being defined by MIT, Cambridge, Mass.). It is through the interface from the co-processor 200 that all the window displays [i.e., the screen display (s) of the open system (s)] and windows controls are performed, including commands to the graphic card 150 to specify where to place the single window to the process on the screen of the CRT 151. The interface between the graphics card 150 and the co-processor 200 is the full windows interface. One of the windows is the display referred to above as the "single window to the processor" (sometimes referred to as the LCN window). The co-processor 200 commands the graphics card 150 where the LCN window is to be placed on the CRT 151 and its relative size on the display. X-windows is a well defined protocol of how to communicate with the graphics card 150 (or any graphics card) and display, and a computer permitting many windows to be displayed. This includes displaying at least one window from the LCN and/or at least one window from the open system 300. In this system, a server is defined in X-windows as the machine that is driving the display (or that portion of the co-processor 200 which interfaces to the graphics card 150), and a client is the application program, in the present embodiment, the DEC processor 300.

The client 300 can have data which is desired to be displayed. The client 300 communicates with the server portion of the co-processor 200 through an X-windows protocol indicating data to be displayed. The server portion of the co-processor 200 communicates with the graphics card 150 through a device dependent layer (DDL) and is provided by the vendor of the graphics card, or in X-windows is via DDX protocol. The microprocessor 156 maintains the integrity of the card bus 152 into the data memory 154. The processing of the data to be displayed on the CRT 151 is performed by the graphics processor 160. When a predetermined data screen is to be displayed, the microprocessor 156 (which accepts requests from the LCN 120 via module bus 36) places the data in shared memory 158, and is subsequently processed by the graphics processor 160, and is then stored in data memory 154. When the open system 300 (via the client) desires to display some information, the information is communicated to the server portion of the co-processor 200 which then stores the information in the shared memory 158. The graphics processor 160 then processes that information and stores it in the data memory 154 for display. In that manner, and under the control of the graphics processor 160, the plurality of displays, i.e., windows, is displayed on the CRT 151.

It will be understood by those skilled in the art that the X-window protocol is essentially the open interface standard, the X-window protocol being readily available and well known to those skilled in the art. In the preferred embodiment the UNIX operating system is utilized, the UNIX operating system being able to run on many commercially available processors. Further information on the preferred embodiment of the graphics card 150 of the preferred embodiment of the US 122 can be had by reference to U.S. Pat. Nos. 4,490,797 and 4,663,619, although it will be understood that any graphics card can be utilized as discussed above. The graphics processor 160 of the preferred embodiment of the present invention is a Texas Instruments (TI) TMS 34020. The microprocessor 156 and the module CPU 38 is a Motorola 68020. The co-processor 200 of the preferred embodiment of the present invention is a Motorola 68040, having bus capability with the other microprocessors of the system. It will be understood that a variety of processors can be utilized including a reduced instruction set processor which is available from Hewlett Packard among other processor manufacturers.

Although the preferred embodiment utilizes the UNIX operating system, it will be recognized by those skilled in the art that any operating system can be utilized, including OSF1, Open Systems Foundation/USA, Cambridge, Mass. Although the co-processor 200 is controlling the display in the preferred embodiment the graphics card can also perform the display control. Since X-windows was readily available and performed the desired display control function, X-windows was utilized to take advantage of the availability of the desired control function. It will be recognized by those skilled in the art that implementation of the present invention is not limited to X-windows, and that any protocol can be utilized.

Thus it can be seen that the process control system 10 is open system permitting other system to interface into the LCN of the process control system and, because of the communication scheme as described above, the integrity of the process control system 10 is maintained.

Further, if the co-processor 200 is running and controlling the display unit 151 (and in particular the actual display on the screen of the display unit 151) and a malfunction occurs or some other anomaly occurs to the co-processor 200, the function of the graphics card 150 guarantees that a single view of the process control system is maintained. As discussed above, the co-processor is connected into the US 122 and has (and controls) a graphical interface through the display 151 and keyboard 153.

Referring to FIG. 8, which comprises FIGS. 8A and 8B, there is shown an example of two displays of the display unit 151. FIG. 8A shows an example of a typical normal display and FIG. 8B shows a display when an anomaly occurs with the co-processor 200, or the fallback display. FIG. 8A shows, for example, the windows which can be displayed. The windows always include a "view of the process" i.e. a control view from the process control system 10. Also included can be, for example, a window showing event history (a process control system application) coming from an outside system, running a process control system application, for example a DEC computer system 300 as shown in FIG. 5. Another window can be data coming from another outside computer system (not shown), for example such as an Apple computer. This computer system can be running another application program referred to as documentation (in the preferred embodiment of the process control system the documentation of the process control system is created on an Apple computer). Still another window can be displayed, for example, lab data, coming from a Hewlett Packard computer system. The windows, except for the control view, are displayed on a single screen of the display unit 151, the display information for these windows coming from a number of outside computer systems connected into the co-processor 200. If an error is detected with the co-processor 200, the method of the present invention guarantees that the display windows from the outside systems are inhibited and the control view is the only display shown and is zoomed to take up the entire screen of the display unit 151. This observation also serves as an indication to the operator that a malfunction has occurred with the interface to the outside systems.

The graphics card 150 has two input communications channels, as discussed above, a first channel is to the LCN 120 via the microprocessor 156/module bus 36 and a second channel is to the co-processor 200 via the microprocessor 156/card bus 152. The first channel is a fail safe channel and utilizes all the same mechanisms that is utilized by the LCN 120. The microprocessor 156 of graphics card 150 grants the communication of the first channel (i.e., the channel to the LCN 120) a higher priority than that of the second channel. The data received from the first channel is maintained securely by the graphics card 150 in order to insure that the co-processor 200 cannot corrupt that data, i.e., the co-processor 200 does not have direct access to the module memory 40 and the data memory 154.

The second channel provides, in the preferred embodiment of the present invention, the X-windows environment, i.e., the open systems OSF (Open Systems Foundation Standard). Also as has been mentioned above, the X-windows is a standard which defines a protocol between different computer systems to allow them to display from any of the computers connected to the display, thereby being able to achieve the windows display as discussed hereinunder in conjunction with FIG. 8

In order to maintain the integrity of the process control system 10 the system includes those functions which guarantees that the control view will always be maintained. Therefore, if any malfunction occurs to the machines on the outside network to cause the co-processor 200 to malfunction (i.e., X-windows to crash), the control view is the primary (or fallback) view to the operator. The process control system 10 (i.e., the modules of the process control system 10 and specifically the operator station 122) takes control of the graphics and displays the control view. The reliability of the process control system is very high, thus it is highly certain that the control view can always be displayed. The control view display data comes from the LCN totally independent of the co-processor 200 of the opens systems network. However, everything else on the display comes from the open systems network. In the preferred embodiment the X-windows environment, the co-processor 200 is controlling the windows. The co-processor 200 is communicating with the graphics card 150, i.e., passing along all the data collected from the open systems network and passing along the control display information, thereby controlling the display. However the coprocessor 200 is not drawing the control view, but is controlling where on the screen the control view is displayed.

The display example of FIG. 8 has all the display information and control information stored in the data memory 154 of graphics card 150. The control view data is inputted into the data memory 154 of graphics card 150 from the LCN 122 by a module bus 36 and microprocessor 156. All the display data of the other views is inputted to the graphics card 150 from the co-processor 200. This data is stored in the data memory 154 via card bus 152, shared memory 158, and graphics processor 160. The graphics processor 160 is processing the inputs and storing the results in the data memory 154 in a predetermined format consistent with the control commands from the co-processor 200 and in a format consistent with the information as is anticipated by the display unit 151.

While there has been shown what is considered the preferred embodiment of the present invention, it will be manifest that many changes and modifications can be made therein without departing from the essential scope and spirit of the invention. It is intended, therefore, in the annexed claims to cover all such changes and modifications that fall within the true scope of the invention.

We claim:

1. An apparatus for providing an interface between a first system and a second system, the first system having a proprietary protocol and further having a first network bus having a plurality of physical modules operatively connected to the first network bus, each of the physical modules capable of communicating with each other via the proprietary protocol over the first network bus, said apparatus comprising:

a) a module bus;
   b) a bus interface unit connected to the module bus and to the first network bus, for providing an interface between the apparatus and the first system;
   c) a module memory, connected to the module bus, for storing information of the apparatus, information including programs and data;
   d) a module CPU, connected to the module bus, for controlling a graphics function of the first system;
   e) a shared memory, connected to the module bus;
   f) a graphics card, connected to the module bus, for performing the graphics function of the apparatus, the graphics card further interfacing with a display unit and a keyboard; and
   g) a co-processor, operatively connected to the shared memory and to the graphics card, and further connected to the second system, the co-processor and the module CPU communicating with each other via the shared memory, the co-processor also communicating with the second system via a known predetermined protocol, the co-processor translating requests from the second system into a form compatible with the proprietary protocol of the first system, the co-processor transmitting commands to the graphics card for controlling the display unit such that information from the first system and the second system is displayed in a windows format, the apparatus thereby providing an opening of the graphical interface to the second system while maintaining the integrity of the first system.

* * * * *